(12) United States Patent  (10) Patent No.: US 8,559,749 B2
Reams  (45) Date of Patent: Oct. 15, 2013

(54) AUDIOVISUAL CONTENT DELIVERY SYSTEM

(75) Inventor: Robert W. Reams, Mill Creek, WA (US)

(73) Assignee: Streaming Appliances, LLC, Mill Creek, WA (US)

( * ) Notice: Subject to any disclaimer, the term of this patent is extended or adjusted under 35 U.S.C. 154(b) by 640 days.

(21) Appl. No.: 12/701,223

(22) Filed: Feb. 5, 2010

(65) Prior Publication Data

US 2011/0164827 A1 Jul. 7, 2011

Related U.S. Application Data

(60) Provisional application No. 61/292,703, filed on Jan. 6, 2010.

(51) Int. Cl.
*G06K 9/40* (2006.01)

(52) U.S. Cl.
USPC ........... 382/269; 382/232; 382/260; 382/261; 382/262; 382/263; 382/264; 382/265; 382/266; 382/267

(58) Field of Classification Search
USPC .......................................... 382/232, 260–270
See application file for complete search history.

(56) References Cited

U.S. PATENT DOCUMENTS

| | | | | |
|---|---|---|---|---|
| 5,473,376 | A * | 12/1995 | Auyeung | 348/403.1 |
| 5,850,481 | A * | 12/1998 | Rhoads | 382/232 |
| 6,993,199 | B2 * | 1/2006 | Chebil | 382/240 |
| 2004/0170330 | A1 * | 9/2004 | Fogg | 382/232 |
| 2006/0277042 | A1 * | 12/2006 | Vos et al. | 704/223 |
| 2007/0247550 | A1 * | 10/2007 | Plaunt | 348/515 |

* cited by examiner

*Primary Examiner* — Jayesh A Patel (74) *Attorney, Agent, or Firm* — Jackson Walker L.L.P.; Christopher J. Rourk (57) ABSTRACT

A system for processing video data to improve image quality at low data rates comprising an encoder generating an entropy signal representing the relative entropy of the video data and a plurality of filters each receiving the entropy signal and a threshold setting and filtering the video data if the entropy signal is greater than the threshold setting.

19 Claims, 7 Drawing Sheets

AUDIOVISUAL CONTENT DELIVERY SYSTEM

RELATED APPLICATION

This application claims priority to U.S. provisional application 61/292,703, filed Jan. 6, 2010, entitled "Audiovisual Content Delivery System," which is hereby incorporated by reference for all purposes.

FIELD OF THE INVENTION

The invention relates to delivery of audiovisual content over a packet-switched network, and more particularly to a video data compression process that removes video artifacts that are usually caused by inefficient compression processing, resulting in the loss of detail.

BACKGROUND OF THE INVENTION

Delivery of audiovisual content over a packet-switched network, such as an Internet protocol network, is known in the art. Many obstacles persist in the commercialization of services for provision of audiovisual content in this manner. For example, the amount of bandwidth required to provide audiovisual content having a quality that is acceptable to a viewer on a large screen is usually much greater than the amount of bandwidth that is available to most users.

SUMMARY OF THE INVENTION

A system and method for delivering video content is provided that decreases the amount of bandwidth required to provide high quality video data. The system and method use symmetrical threshold settings for anti-jitter and anti-aliasing filters using an entropy-based threshold to preprocess the video data, so as to reduce the bandwidth required while maintaining acceptable picture quality to a viewer.

A system for processing video data to improve image quality at low data rates is provided. The system includes an encoder generating entropy data representing the relative entropy of the video data and a plurality of filters, each receiving the entropy signal and a threshold setting and filtering the video data if the entropy signal is greater than the threshold setting.

DETAILED DESCRIPTION OF PREFERRED EMBODIMENTS

In the description that follows, like parts are marked throughout the specification and drawings with the same reference numerals, respectively. The drawing figures might not be to scale and certain components can be shown in generalized or schematic form and identified by commercial designations in the interest of clarity and conciseness.

Figure 1:
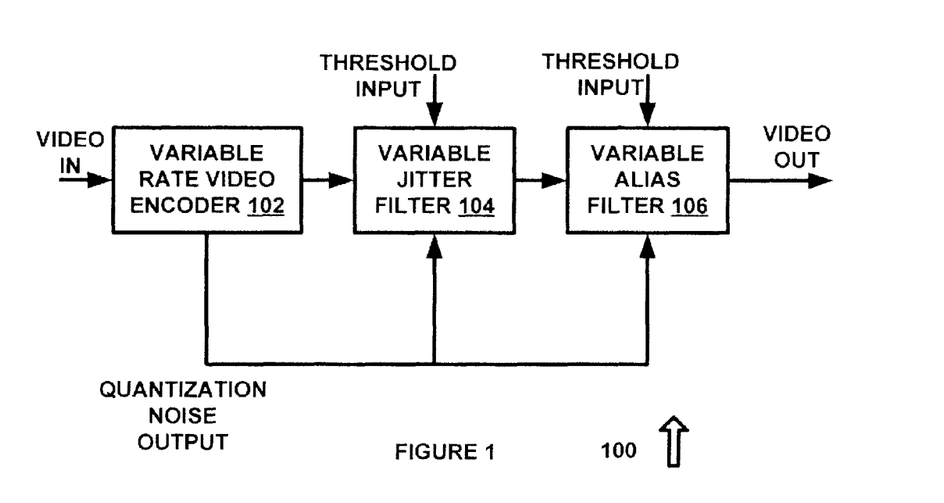
FIG. 1 is a diagram of a system for providing video compression in accordance with an exemplary embodiment of the present invention.

FIG. 1 is a diagram of a system 100 for providing video compression in accordance with an exemplary embodiment of the present invention. System 100 allows variable rate video data to be compressed without noticeable loss of quality.

System 100 includes variable rate video encoder 102, which can be implemented in hardware or a suitable combination of hardware and software, and which can be one or more software systems operating on a general purpose processing platform. In one exemplary embodiment, variable rate video encoder 102 can be an MPEG4 part 10-compliant variable rate video encoder operating on a general purpose processing platform, an application specific integrated circuit, or other suitable platforms. Variable rate video encoder 102 receives video data and generates a variable rate video output. In one exemplary embodiment, the variable rate video output can be at a variable bandwidth that is higher than a target bandwidth. Thus, further processing of the output of variable rate video encoder 102 can be required in order to provide a bandwidth at a desired level. Likewise, where the bandwidth of the video is low, no additional processing is required. An indicator of whether additional processing is required can be obtained based on the entropy of the video signal being processed, where a high level of entropy generates a high level of quantization noise.

Variable rate video encoder 102 generates a quantization noise output, such as an indication of the amount of variation in macroblocks, blocks, pixels, or other video data. In one exemplary embodiment, the quantization noise output can be a variable bit rate mode output of the MPEG 4 part 10 encoder, which can also be characterized as an indication of the entropy of the video that is being encoded.

System 100 includes variable jitter filter 104, which can be implemented in hardware or a suitable combination of hardware and software, and which can be one or more software systems operating on a general purpose processing platform. Variable jitter filter 104 provides a controllable amount of jitter reduction based on an input. Threshold input and quantization noise output are used to determine whether a threshold has been exceeded for activation of variable jitter filter 104. In one exemplary embodiment, when the quantization noise output is below a threshold input, variable jitter filter 104 will not be activated. Likewise, when the quantization noise output exceeds the threshold input, the variable jitter filter 104 will reduce jitter by a predetermined amount related to the difference between the quantization noise output and the threshold input.

Variable aliasing filter 106 receives the filtered output from variable jitter filter 104 and performs anti-aliasing filtering based upon an input quantization noise level and a threshold input. In one exemplary embodiment, variable aliasing filter 106 can receive the quantization noise output and the threshold input and can deactivate aliasing filtering if the quantization noise output is below the threshold level, otherwise, variable aliasing filter 106 performs aliasing filtering based on the difference between the threshold input level and the quantization noise output level.

In operation, system 100 can be used to reduce the bandwidth of a variable rate video signal without creating video artifacts, such as blurriness or lack of picture quality. System 100 activates a variable jitter filter 104 and variable aliasing filter 106 when quantization noise levels exceed threshold inputs to the filters. In one exemplary embodiment, the threshold inputs to both filters can be matched, such that they are symmetric. By making the threshold level symmetric, the video artifacts generated by processing the video signal through variable jitter filter 104 and variable aliasing filter 106 can be minimized.

Figure 2:
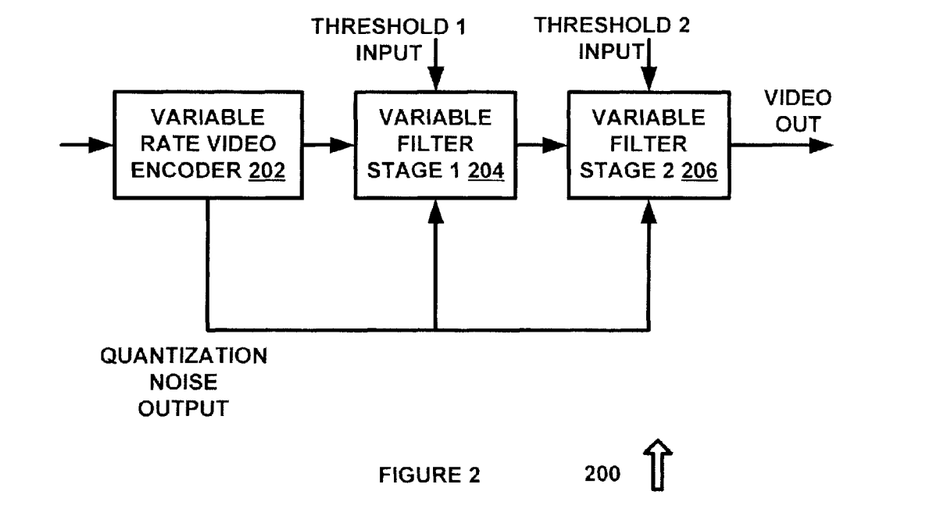
FIG. 2 is a diagram of a system for processing video data in accordance with an exemplary embodiment of the present invention.

FIG. 2 is a diagram of a system 200 for processing video data in accordance with an exemplary embodiment of the present invention. System 200 includes variable rate video encoder 202, which can be implemented in hardware or a suitable combination of hardware and software, and which can be one or more software systems operating on a general processing platform, such as an MPEG 4 part 10 variable rate video encoder. Quantization noise output from variable rate video encoder 202, such as the variable bit rate mode output of the MPEG 4 part 10 encoder is provided as an input to variable filter stage 1 204 and variable filter stage 2 206. Likewise, variable filter stage 1 204 receives a threshold 1 input, and variable filter stage 2 206 receives a threshold 2 input. In one exemplary embodiment, variable filter stage 1 204 and variable filter stage 2 206 can include a variable jitter filter 104 and variable aliasing filter 106, or other suitable filters. Likewise, the thresholds provided to the filters that comprise variable filter stage 1 204 and variable filter stage 2 206 can be symmetric threshold levels.

In operation, system 200 provides multiple stage filtering of a video signal to further reduce the bandwidth of the video signal and improve signal quality. In this exemplary embodiment, threshold 1 input can have a first size or speed, such as a slow speed, and threshold 2 input can have a second speed, such as a higher speed, so as to stage the filtering of the variable rate video data signal and reduce the signal bandwidth without affecting signal quality.

Figure 3:
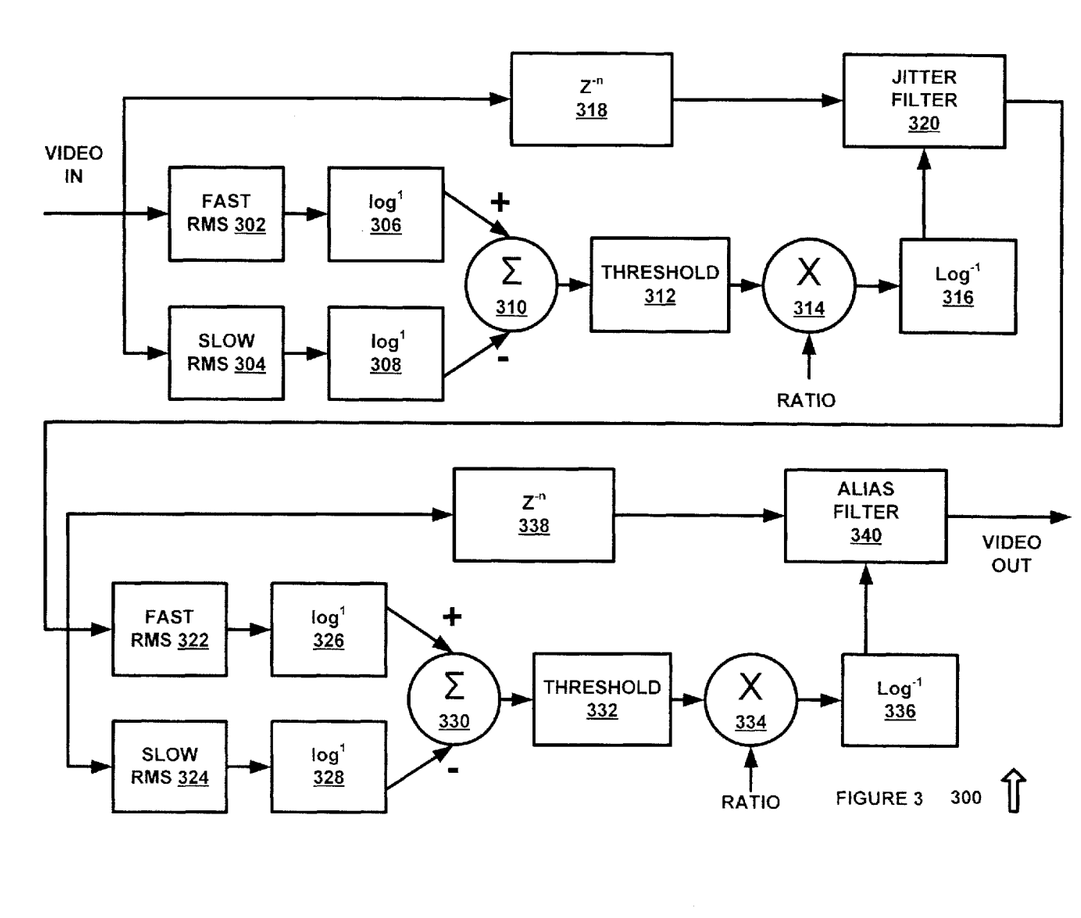
FIG. 3 is a diagram of a system for filtering video signals in accordance with an exemplary embodiment of the present invention.

FIG. 3 is a diagram of a system 300 for filtering video signals in accordance with an exemplary embodiment of the present invention. System 300 can be implemented in hardware or a suitable combination of hardware and software, and can be one or more software systems operating on a general purpose processing platform.

System 300 receives a video input signal at fast RMS processor 302 and slow RMS processor 304. RMS processors 302 and 304 satisfy the equation:

$$f_{RMS} = \lim_{T \to \infty} \sqrt{\frac{1}{2T} \int_{-T}^{T} [f(t)]^2 dt}.$$

with fast RMS processor 302 having a shorter integration time than slow RMS processor 304.

The output from fast RMS processor 302 is processed by $\log^1$ processor 306, and the output from slow RMS processor 304 is processed by $\log^1$ processor 308. The outputs from $\log^1$ processors 306 and 308 are provided to summer 310, which subtracts the output of $\log^1$ processor 308 from the output of $\log^1$ 306, and provides the output to threshold 312. Threshold 312 can receive a user programmable threshold level and outputs a signal if the input exceeds the threshold. The output is then provided to ratio multiplier 314, which receives a predetermined ratio and multiplies the output by the predetermined ratio. The output from ratio multiplier 314 is fed into $\log^{-1}$ processor 316 which is provided as an input to jitter filter 320.

The video input is also provided to $Z^{-n}$ processor 318, which performs a $Z^{-n}$ transform on input video data. The output of $Z^{-n}$ processor 318 is provided to jitter filter 320, which performs jitter filtering based on the setting received from $\log^{-1}$ processor 316.

The output from jitter filter 320 is provided to fast RMS processor 322 and slow RMS processor 324, which perform processing of the video signal as previously discussed. The output from fast RMS processor 322 is provided to $\log^1$ processor 326 and the output from slow RMS processor 324 is provided to $\log^1$ processor 328.

The outputs from $\log^1$ processors 326 and 328 are provided to summer 330 which subtracts the output of $\log^1$ processor 328 from the output of $\log^1$ processor 326 and provides the difference to threshold 332, which passes the unmodified signal if the input is below a predetermined threshold and which passes a threshold modified signal if the input is above the predetermined threshold. Multiplier 334 multiplies the output from threshold 332 by a ratio, which is provided to $\log^1$ processor 336. The output of $\log^{-1}$ processor 336 is provided to alias filter 340.

The output of jitter filter 320 is provided to $Z^{-n}$ processor 338, and which is then filtered by alias filter 340 in response to the output of $\log^{-1}$ processor 336. The video output signal that is generated has a lower bandwidth at higher quality than video processed using other processes. Likewise, the threshold levels set by threshold 312 and 332 can be symmetric thresholds.

In operation, system 300 performs compression of a variable rate video signal to provide improved video quality at lower bandwidth.

Figure 4:
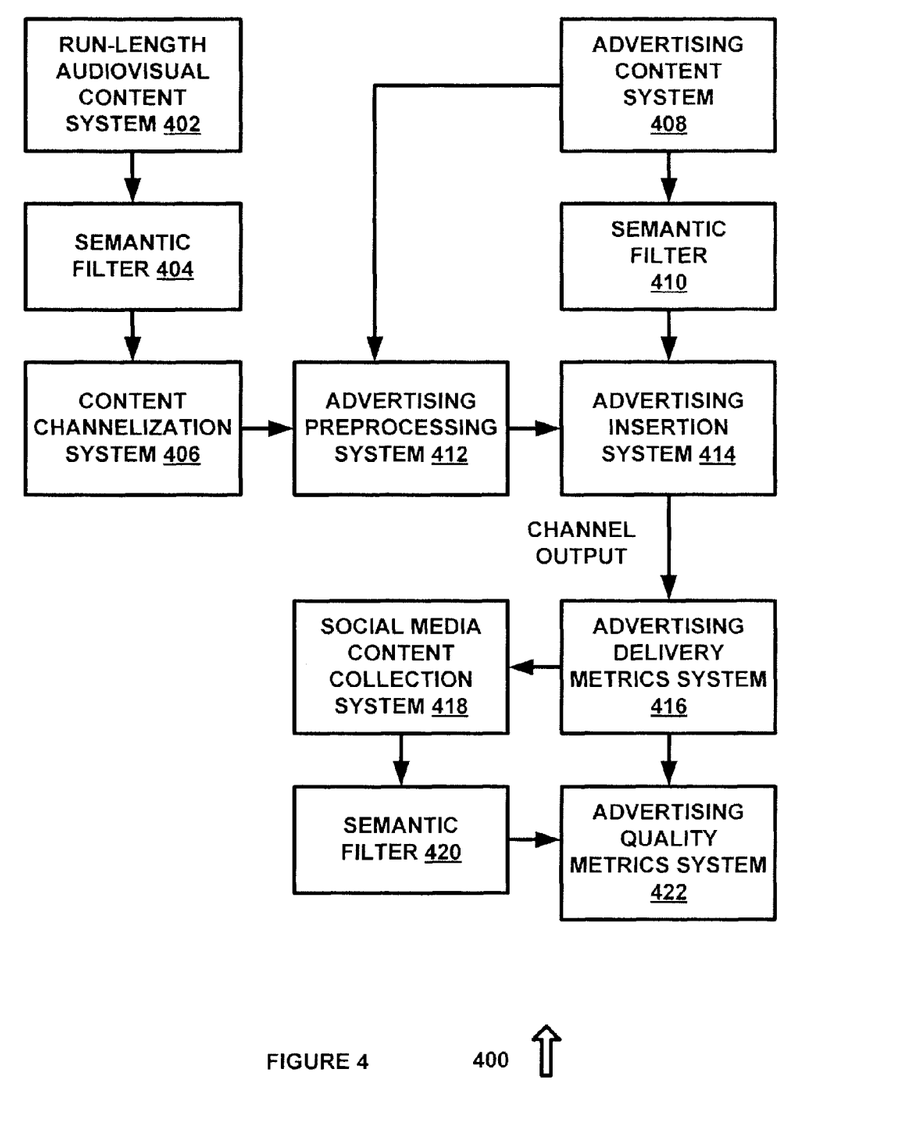
FIG. 4 is a diagram of a system for channelizing run-length audiovisual content, matching the channelized run-length audiovisual content with advertising, and for determining the effectiveness of the matched advertising and run-length audiovisual content in accordance with an exemplary embodiment of the present invention.

FIG. 4 is a diagram of a system 400 for channelizing run-length audiovisual content, matching the channelized run-length audiovisual content with advertising, and for determining the effectiveness of the matched advertising and run-length audiovisual content in accordance with an exemplary embodiment of the present invention. As used herein, "run-length audiovisual content" refers to programmatic audiovisual content having a duration, theme, characters, plot, focus (such as scientific programs or sporting events), or other characteristics that distinguish audiovisual content that is viewed for entertainment or information purposes from advertising. "Advertising" can include programs such as "infomercials," but more typically includes content that can be included within the "run-length audiovisual content," such as icons that can be selected by a user, headers or footers, watermarks or other content that is not the selecting factor in a user's decision to view the "run-length audiovisual content," but rather which is usually included with the "run-length audiovisual content" for a fee, for a public service, or for reasons other than the purpose for the "run-length audiovisual content."

System 400 can be implemented in hardware or a suitable combination of hardware and software, and can be one or more software systems operating on a general purpose processing platform. As used herein, "hardware" can include a combination of discrete components, an integrated circuit, an application-specific integrated circuit, a field programmable gate array, a digital signal processor, or other suitable hardware. As used herein, "software" can include one or more objects, agents, threads, lines of code, subroutines, separate software applications, two or more lines of code or other suitable software structures operating in two or more software applications or on two or more processors, or other suitable software structures. In one exemplary embodiment, software can include one or more lines of code or other suitable software structures operating in a general purpose software application, such as an operating system, and one or more lines of code or other suitable software structures operating in a specific purpose software application.

Run-length audiovisual content system 402 provides run-length audiovisual content programs for analysis. In one exemplary embodiment, run-length audiovisual content system 402 can include a plurality of sources of run-length audiovisual content that are processed to extract text for semantic filtering.

Semantic filter 404 filters content, such as by analyzing the relationship of words, phrases and terms. In one exemplary embodiment, semantic filter 404 is used to distinguish first content from second content, where the first and second content have the exact same words, but where the order of the words have substantially different meanings. Semantic filter 404 uses a database of semantic metrics to score content, where the database is configured based on a flexible set of user-defined rules. For example, a semantic filter can be used to identify content relating to certain topics, such as "food," by identifying text strings that are associated with food topics, such as "cooking," "dining," and "groceries." These text strings can be characterized as a "lexicon manifold," where the words, terms or phrases that are associated with a particular category of the semantic filter form a lexicon, and the set of categories and associated lexicons form a manifold that can be used to perform semantic filtering. Likewise, text strings that may appear to be associated with food but which represent other topics, such as "brain food" in the current example, can be identified as excluded strings that should be ignored. Food is only provided as an exemplary topic, and any other suitable topic can also or alternatively be processed or identified using semantic filter 404. Typically, semantic filter 404 will be used to generate metrics for content that can be used to group the content with related content, to match the content with advertising that is related to the content or of potential interest to content viewers, or for other suitable purposes.

Content channelization system 406 receives filtered run-length audiovisual content from semantic filter 404 and assembles the run-length audiovisual content into channels. In one exemplary embodiment, content channelization system 406 can use semantic filter settings or output and can select run-length audiovisual content based on the semantic filter settings or output. Likewise, content channelization system 406 can have predetermined run-length audiovisual content, which can be processed using a semantic filter 404 to ensure that it complies with the parameters for a predetermined channel in content channelization system 406.

Advertising content system 408 provides advertising content. In one exemplary embodiment, advertising content can be provided by advertisers, such as standard advertising content developed by the advertisers produced with other media. In another exemplary embodiment, advertising content system 408 can be used in conjunction with a semantic filter to develop advertising scripts that match semantic filter settings or output for channels of audiovisual content.

Semantic filter 410 processes advertising content from advertising content system 408 to generate a plurality of semantic filter settings or outputs. In one exemplary embodiment, the semantic filter settings or outputs can be selected to match advertising content from advertising content system 408 with run-length audiovisual content from run-length audiovisual content system 402.

Advertising preprocessing system 412 allows a user to modify run-length audiovisual content to add advertising content. In one exemplary embodiment, advertising preprocessing system 412 allows a user to insert markers into audiovisual content so as to cause the advertising from advertising content system 408 to be automatically linked to the audiovisual content, such as by including tags in the audiovisual content. In another exemplary embodiment, systems or processes such as those provided or used by Princeton Video Image can be used to process run-length audiovisual content to insert tags into the run-length audiovisual content to allow advertising to be merged into the run-length audiovisual content. For example, a billboard in run-length audiovisual content such as a sporting event can be processed to remove the advertising on the billboard and to replace it with a tag, to allow advertising to be dynamically inserted into the location of the billboard in the audiovisual content. Likewise, advertising preprocessing can be used to associate advertising content from advertising content system 408 with run-length audiovisual content from run-length audiovisual content system 402, such as by placing tags on cans, bottles, boxes, or other props.

Advertising insertion system 414 receives advertising content from semantic filter 410 and inserts the advertising where available and where suitable. In one exemplary embodiment, advertising insertion system 414 can insert advertising on a space available basis, such as backdrops on sports fields, billboards and programming, or any other suitable locations. Advertising insertion system 414 outputs the channelized content.

Advertising delivery metrics system 416 generates one or more advertising delivery metrics, such as a number of requests for additional information, a number of follow-ups on requests received from users/viewers, or other suitable metrics. In one exemplary embodiment, during presentation of run-length audiovisual content, advertising triggers inserted in the audiovisual content can be selected by viewers. Advertising delivery metrics system 416 can count the number of times that viewers requested additional information or otherwise indicated an interest in an advertized product or service, can determine the number of times that viewers followed up on such requests, can determine whether or not users purchased such requests, can determine whether free samples of the advertised products were provided, or can otherwise provide advertising delivery metrics.

Social media content collection system 418 monitors social media that is responsive to advertising for associated content. In one exemplary embodiment, certain types of social media such as Twitter, Facebook, blogs or other social media, can be identified that track certain types of advertising. For example, some types of social media attract feedback on predetermined audiovisual content programs, such as blogs or discussion groups that are identified by the name of the program, or that may be subject of certain interest groups. Social media content collection system 418 collects text from social media associated with such predetermined social media groups.

Semantic filter 420 filters the text data from social media content collection system 418 based on advertising inserted into the run-length audiovisual content by advertising preprocessing system 412 or advertising insertion system 414. In one exemplary embodiment, the advertising provided to run-length audiovisual content can be used to set settings of semantic filter 420, such as to look for predetermined phrases that are related to the advertising or for other suitable purposes. The output of semantic filter 420 can thus be used to determine an indication of the success or failure of the advertising. In one exemplary embodiment, advertising success metrics can be determined based on an expected semantic filtering output. Where the semantic filtering output differs from the expected output, the output can be determined to have an error that may be corrected in future iterations.

Advertising quality metrics system 422 generates one or more advertising quality metrics, such as number of successful deliveries per program view, success of a relationship between semantic filtering from social media and advertising targets, or other suitable quality metrics. In one exemplary embodiment, the semantic filtering performed on text data from social media content collection 418 can include positive and negative indicators, and can be correlated to advertisement scoring data and advertising metrics data to provide an indication of advertising quality. For example, an advertisement can include an offer for a free sample of a product, where the user receives a message that can be printed and exchanged for the free sample. Text from social media that is associated with the free sample and advertisement can be monitored and collected, and the semantic filter can score the words and phrases associated with the free sample based on positive or negative connotations. In this manner, the effectiveness of the advertising can be determined by monitoring social media to detect key words associated with an advertisement and to perform semantic filtering of the social media data to determine whether the response to the advertisement and the product that is the focus of the advertisement is positive, neutral or negative.

In operation, system 400 provides a new paradigm for audiovisual content delivery and advertising. In one exemplary embodiment, system 400 can allow run-length audiovisual content to have advertising inserted in a manner that does not interrupt the run-length audiovisual content, and provides for immediate monitoring of indicators of consumer interest in advertised products. Likewise, system 400 can monitor social media for feedback on advertising trends, so as to give near real time feedback on the success or failure of a single advertisement to an entire advertising campaign. For example, a new soft drink producer can initiate an advertising campaign at a predetermined time by offering free samples of its new soft drink. Social media can then be monitored to determine if discussion of the offer is being circulated in certain social media outlets, such as recommendations for others to watch content or to obtain free samples of the product. In this manner, system 400 can provide real time or near real time metrics of run-length audiovisual content and advertising content that does not currently exist.

Figure 5:
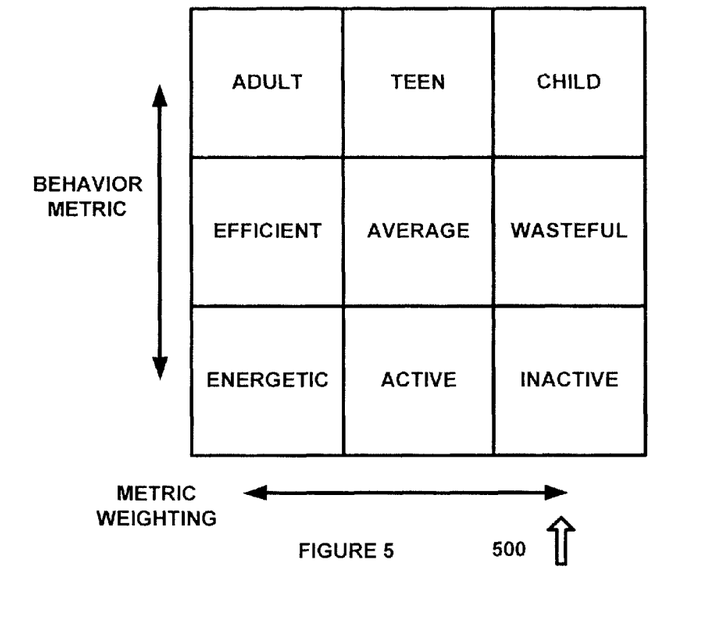
FIG. 5 is a diagram of a semantic filter in accordance with an exemplary embodiment of the present invention.

FIG. 5 is a diagram of a semantic filter 500 in accordance with an exemplary embodiment of the present invention. Semantic filter 500 provides an exemplary semantic filter that can be used to process text to classify the text for ranking with associated content, such as to match run-length audiovisual content with interest groups and to match advertising content with run-length audiovisual content.

Semantic filter 500 includes behavior metrics and metric weightings. In one exemplary embodiment, a three by three metric matrix can be used, where three exemplary behavior metrics are shown. In this exemplary embodiment, a behavior metric ranking behavioral attributes as adult, teen and child is shown, but additional gradations can be provided. For example, preteen, senior, young adult, or other suitable gradations can be provided to improve the sensitivity of the first behavior metric along the metric weighting axis.

Likewise, a second behavior metric having weightings of efficient, average and wasteful is provided. As previously discussed, additional metric weightings can be provided such as professional, competent, careless, extravagant, or other similar subjective measures, which can be associated with concepts, terms, or other information that can be used to filter text to identify whether the text associates to concepts along the weighting metric.

A third exemplary behavior metric is shown with weightings of energetic, active and inactive. Likewise, as previously discussed, additional weighting metrics can be provided, such as vigorous, brisk, idle, sluggish or other suitable gradations along the metric weighting axis, to provide as much detail as desired in quantifying and filtering semantic content.

In operation, semantic filter 500 can be used to create a grading paradigm for textual content to classify the textual content automatically and based upon predetermined metrics. For example, content can be determined to fall within the metrics of adult, average and inactive based upon textual content or phrases within the content. For example, adult content may have phrases or other semantic measures associated with adults and disassociated from teens or children. Likewise, content can be associated with an average behavior metric, relative to an efficient behavior metric and a wasteful behavior metric, such as in regards to environmental efficiency or wastefulness. Likewise, content can be semantically filtered based on semantic tags associated with energetic activity, active activity, and inactive activity. The different metrics and their associated weightings are used to classify the text for semantic filtering, and frequency of occurrences are tracked as a third dimension. For example, frequency of occurrence can be normalized (e.g., where the metrics and weights having the greatest number of occurrences of text from semantic filtering have a value of 1.0 and where the other metrics range from 1.0 to 0.0), frequency of occurrence can be absolute (e.g. where one metric has X occurrences, a second, metric has Y occurrences, etc., where X and Y are whole numbers), frequency of occurrence can be tracked on a log scale, or other suitable manners for tracking frequency of occurrence can be used. For example, if a 30 minute program has over 500 adult content occurrences from semantic filtering, that show might be classified as adult content regardless of whether there are a greater absolute number of "teen" or "child" content occurrences.

This process can also be performed in an iterative manner to "tune" the semantic filter, such as where the semantic filter settings are tested on content that has a predetermined desired semantic filtering profile (or a benchmark), and where the semantic filter settings are adjusted if groups of content do not match their benchmarks. For example, content that is intended to be benchmarked in different categories, such as live sports and pre-recorded cooking shows, can be processed by the semantic filters to confirm that it is graded or ranked by the semantic filters into different and predetermined categories. If benchmarked content is graded into categories that are different from the expected categories, the semantic filter settings can be reviewed and modified to correct such misplacement.

In another exemplary embodiment, a television program can be processed to extract the text from the television program, and upon processing can be classified based on that text. In an example where the behavior metrics having the highest semantic filter incidence are adult, average, and inactive, the television program may be a serial drama dealing with adult content that is typically shown after 9:00 pm, where the programming is not geared towards environmental efficiency or wastefulness, and where the typical viewers of the content would be associated with people who are inactive as opposed to people who are physically energetic. The semantic filtering processes for making these determinations are based on real world sampling of individuals, and how those individuals would react to the programming content. However, once the associations are generated, other content can be processed to determine if the semantic filtering is effective. In this manner, a recursive process can be used where additional programming and content is added to the semantic filtering database to prove the accuracy of the semantic filtering.

Likewise, semantic filtering can be used on advertising content, and can be used based on the persons reviewing the content and the advertising content. For example, a reviewer may be asked to classify themselves with the behavior metrics and metric weighting, and others may be asked to classify the reviewer based on behavior metric and metric weighting. In this manner, a semantic filter map for a reviewer can be determined, and the reviewer's input on content, such as audiovisual run-length, audiovisual programming content or advertising content can also be determined. The Cogito Intelligence Platform semantic filter receives such information and can automatically process run-length audiovisual content, advertising content or other suitable content such as content from social media. In this manner, a number of metrics can be automatically generated from text that can be used to compare run-length audiovisual content with other run-length audiovisual content (such as for channelization) to match run-length audiovisual content with advertising content (such as to automatically insert advertising into run-length audiovisual content), to detect content in social media (for example to determine the effectiveness of advertising content) or for other suitable purposes.

Figure 6:
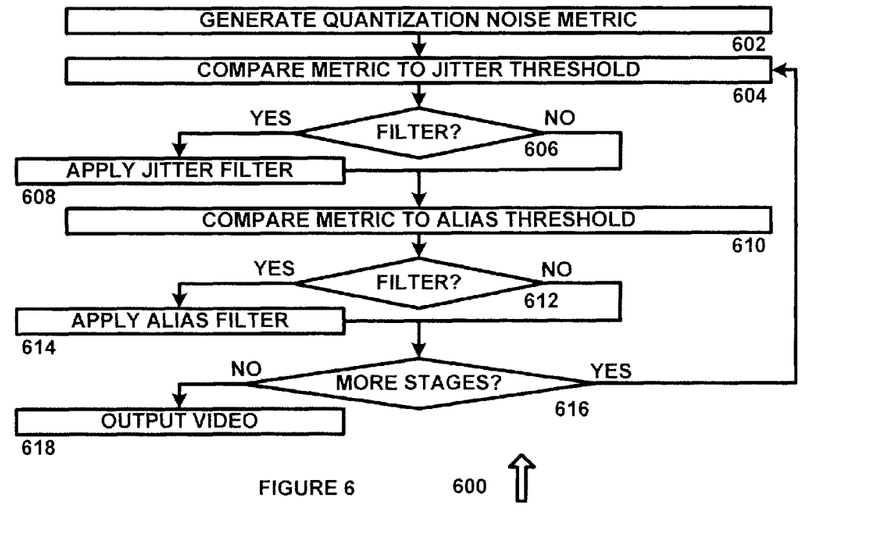
FIG. 6 is a flowchart of a method for improving the image quality of audiovisual data in accordance with an exemplary embodiment of the present invention.

FIG. 6 is a flowchart of a method 600 for improving the image quality of audiovisual data in accordance with an exemplary embodiment of the present invention. Method 600 can be implemented as one or more algorithms running on a general purpose processor so as to create a special purpose machine or in other suitable manners.

Method 600 begins at 602 where a quantization noise metric is generated, such as using an algorithm operating on a processor that measures quantization noise and that outputs a relative number or other suitable data. In one exemplary embodiment, a quantization noise metric can determine the variations in macro blocks, blocks, individual pixels, or other suitable data that comprises frames and video. More particularly, the quantization noise metric can determine changes in subsequent adjacent frames of video data and can generate a figure of merit that is used to determine whether there is significant amount of quantization noise, a low level of quantization noise, or other levels of quantization noise. The method then proceeds to 604.

At 604 the metric is compared to a jitter threshold, such as using a compare algorithm operating on a processor. In one exemplary embodiment, it may be desirable to avoid filtering for jitter if the quantization noise is below a predetermined threshold. The method then proceeds to 606 where it is determined whether or not to filter the video data based on the jitter threshold comparison. If it is determined to filter the audiovisual data the method proceeds to 608, such as by generating suitable control data from a control algorithm that transfers control to a suitable programming point, where a jitter filter is applied at a level equal to the difference between the quantization noise metric and the threshold setting. Otherwise the method proceeds to 610.

At 610 the quantization noise metric is compared to an aliasing threshold, such as using a compare algorithm operating on a processor. In one exemplary embodiment, the aliasing threshold can be symmetric with the jitter threshold, such that aliasing is only used when jitter filtering is applied, and at the same threshold level. The method then proceeds to 612 where it is determined whether to apply an aliasing filter, such as by using an algorithm that determines whether or not the threshold was met. If it is determined not to apply an aliasing filter at 612 the method proceeds to 616, such as by using an algorithm that generates control data transferring control to a suitable programming point. Otherwise, the method proceeds to 614 where the aliasing filter is applied. The method then proceeds to 616.

At 616 it is determined whether more stages in the filter are present. In one exemplary embodiment, the filtering can be provided in a number of stages, such as where a first threshold is used for slower jitter or aliasing changes, and a second or third or additional thresholds are used for faster metrics. In this manner, using a recursive process, the amount of filtering can help to reduce the entropy or quantization noise and associated bandwidth of video programming. If it is determined at 616 that there are more stages, such as by using a detector algorithm for detecting control data, a loop counter or other suitable algorithms, the method returns to 604, otherwise the method proceeds to 618 or the processed videos output for delivery.

In operation, method 600 allows audiovisual data to be processed in a series of stages to reduce the bandwidth of the audiovisual data. In one exemplary embodiment, the jitter filtering and alias filtering is based on a threshold where the quantization noise metric is used to determine if the threshold is met is symmetric for each filter.

Figure 7:
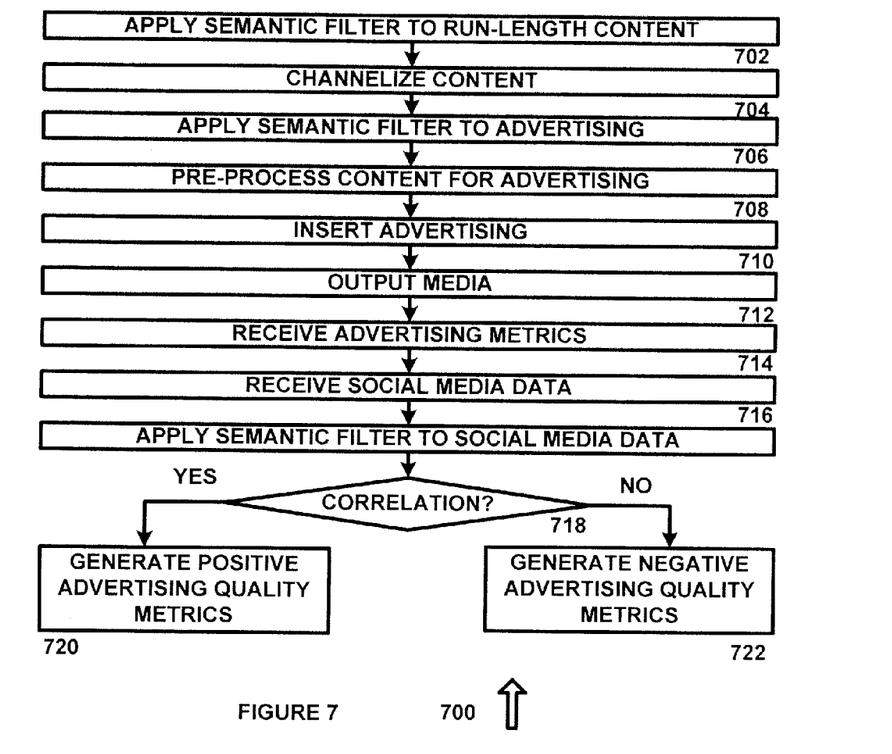
FIG. 7 is a flowchart of a method for providing advertising data and run-length content for on-demand channels in accordance with an exemplary embodiment of the present invention.

FIG. 7 is a flowchart of a method 700 for providing advertising data and run-length content for on-demand channels in accordance with an exemplary embodiment of the present invention. Method 700 can be implemented as an algorithm running on a general purpose processor or other suitable embodiments, such as in the manner previously discussed for various types of processes in regards to method 600.

Method 700 begins at 702 where a semantic filter is applied to run-length content. In one exemplary embodiment, the semantic filter can be used to classify run-length content based on one or more behavior metrics and one or more weighting metrics, where a frequency in each of the different behavior and weighting metric classes is measured based on the text of the run-length content. The method then proceeds to 704.

At 704, the run-length content is channelized. In one exemplary embodiment, depending on the number of behavior metrics and weighting metrics, as well as the frequency measures for run-length content, a number of different channels of channelized content can be created. The channelized content thus tracks the semantic filter to provide content of interest to viewers having predetermined behavioral preferences that match the semantic filter settings. The method then proceeds to 706.

At 706 semantic filtering is applied to advertising. In one exemplary embodiment, the semantic filter can be applied to advertising either after processing of run-length content, or in parallel to the processing of run-length content. Likewise, the application of semantic filter to advertising can be performed as part of the advertising development, such that the advertising is modified to match predetermined semantic filter characteristics. The method then proceeds to 708.

At 708 the run-length content is preprocessed for advertising. In one exemplary embodiment, certain advertisers may pay to have their products advertised in run-length content regardless of the semantic filtering correlation. In this exemplary embodiment, the advertising can be pre-associated with run-length content. The method then proceeds to 710.

At 710 advertising is inserted into additional advertising spaces based on space availability. In one exemplary embodiment, advertising can be inserted into certain marked areas, such as billboards and audiovisual content, backdrops, or in other areas where advertising is expected. The method then proceeds to 712.

At 712 the run-length content is output. In one exemplary embodiment, the channelized content can be provided to a plurality of server locations or head-ends throughout the country, where it can be provided in virtual real time, with the appearance of being channelized. Likewise, on demand programming can be accommodated. The method then proceeds to 714.

At 714 advertising metrics are received. In one exemplary embodiment, the advertising metrics can include the number of times advertising information was requested, the number of times advertising information was viewed, additional information pertaining to the specific types of ads, or other suitable advertising metrics. The method then proceeds to 716.

At 716 social media data is received based on the advertising in the audiovisual ad length audiovisual content. In one exemplary embodiment, the provision of certain types of advertising can be used to select semantic filter data for filtering social media data, such as to determine whether the advertising has had an effect on the discussions in social media. The method then proceeds to 718.

At 718 it is determined whether there is correlation between the advertising content and the social media data. If it is determined that there is a correlation then the method proceeds to 720 where positive advertising quality metrics are generated. Otherwise the method proceeds to 722 where negative advertising quality metrics are generated.

In operation, method 700 allows run-length audiovisual content, advertising content, social media content, and other suitable content to be filtered using a semantic filter to determine correlations between the content for various purposes. For example, the correlations between run-length audiovisual content from semantic filtering can be used to channelize the run-length audiovisual content. Correlations between the run-length audiovisual content and advertising content from semantic filtering can be used to associate the advertising content with the run-length audiovisual content. Correlations between the social media data content and the advertising content can be used to determine whether the advertising was effective or reach the intended audience or had the intended effect on the audience. In this manner, the provision of run-length audiovisual data and advertising can be automated and optimized.

Figure 8:
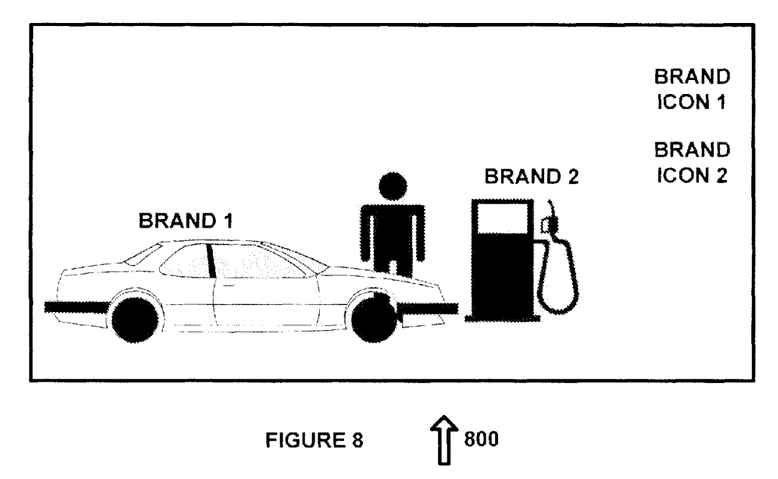
FIG. 8 is a diagram of a screen display in accordance with an exemplary embodiment of the present invention.

FIG. 8 is a diagram of a screen display 800 in accordance with an exemplary embodiment of the present invention. Screen display 800 is an exemplary portion of an audiovisual run-length audiovisual content program showing an automobile, a user or person on the screen, and a gas pump. In this portion of run-length audiovisual content, the person can be getting out of their automobile to fuel the automobile, such that there is a brand opportunity indicated as brand 1 for the automobile and brand 2 for the fuel pump. In this manner, advertisers can be given the opportunity to associate a brand with either brand 1 or brand 2, such that automobile manufacturer may wish to have their automobile superimposed on brand 1, a gasoline manufacturer may elect to have their gasoline superimposed on brand 2, or other suitable combinations can be used. Because brand 1 and brand 2 may not be identified or tagged in the run-length audiovisual content, such branding can be identified using advertising preprocessing system 412, such as by using the Princeton Video Image processes or other suitable processes.

In addition, on the side of video display 800 are brand icon 1 and brand icon 2. These brand icons are user selectable icons that allow a user to request additional information on the associated brand shown on the screen. In this manner, the user viewing the automobile identified as brand can select the brand icon 1 and request additional information. In this manner, the effectiveness of advertising can be determined in real time, and without interruption of programming. Advertising delivery is performed by inserting the advertising into the programming so as to create advertising that is associated with programming. In this manner, recording a video or otherwise removing the programming from real time delivery such as pirating of the content doesn't result in the loss of advertising content.

Figure 9:
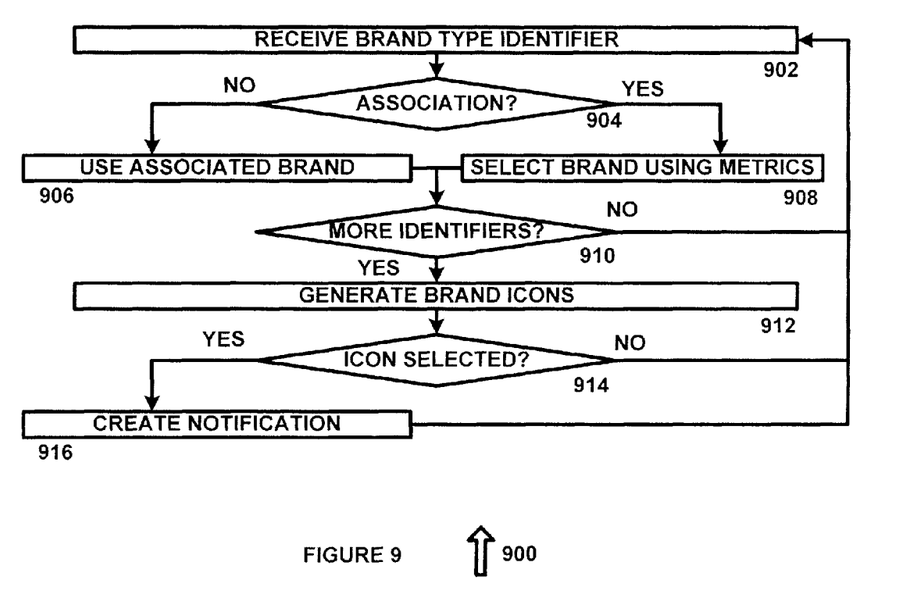
FIG. 9 is a flowchart of a method for monitoring video content delivery to determine whether brand information has been requested in accordance with an exemplary embodiment of the present invention.

FIG. 9 is a flowchart of a method 900 for monitoring audiovisual content delivery to determine whether brand information has been requested in accordance with an exemplary embodiment of the present invention. Method 900 can be implemented as software operating on a general purpose processor so as to create a special purpose machine.

Method 900 begins at 902 where a brand type identifier is received. In one exemplary embodiment the brand type identifier can be associated with a type of product, type of service, or other suitable information. The method then proceeds to 904.

At 904 it is determined whether there is an association with the brand type identifier. In one exemplary embodiment, the association can be added in advertising preprocessing system 412 or in other manners so that predetermined advertising content is refused. Otherwise, in this exemplary embodiment the method proceeds to 906 where the associated brand is used with the brand type identifier. Otherwise, the method proceeds to 908 which brand is selected using semantic filtering metrics, such as based on the product type, consumer class and other suitable information. The method then proceeds to 910.

At 910 it is determined whether there are more brand identifiers on the screen. If more brand identifiers are on the screen, the method returns to 902, otherwise the method proceeds to 912.

At 912 brand icons are generated. In one exemplary embodiment, brand icons can be generated based on new occurrences of brand icons in a frame of video, such that a continuing occurrence of the brand icon within successive frames of video does not generate a new brand icon occurrence. Likewise, brand icons can be generated in order, such that the most recent brand icons will replace the least recent brand icon. The method then proceeds to 914.

At 914 it is determined whether a brand icon has been selected, such as by a user selection of the brand icon. If it is determined that no brand icon has been selected, the method returns to 902. Otherwise, the method proceeds to 916 where a notification is generated. In one exemplary embodiment, the notification can be a message in a user's account, an email message, or other suitable notifications. The method then returns to 902.

Figure 10:
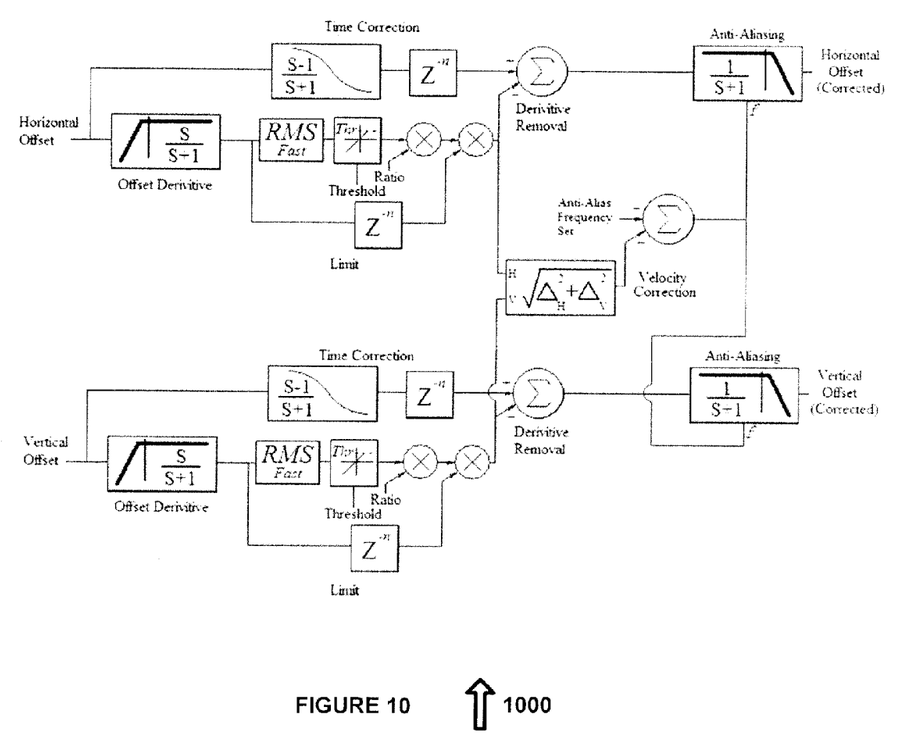
FIG. 10 is a diagram of a system and method for filtering video signals in accordance with an exemplary embodiment of the present invention.

FIG. 10 is a diagram of a system 1000 and method for filtering video signals in accordance with an exemplary embodiment of the present invention. System 1000 can be implemented in hardware or a suitable combination of software and hardware, such as one or more known software tools, such as in the NVIDIA CUDA software package or other suitable software packages for performing the associated function operating on a general purpose processing platform. System 1000 can also be implemented as a method performed by executing algorithms associated with the software tools or other well known algorithms associated with the disclosed functional blocks on a general purpose processing platform.

Figure 11:
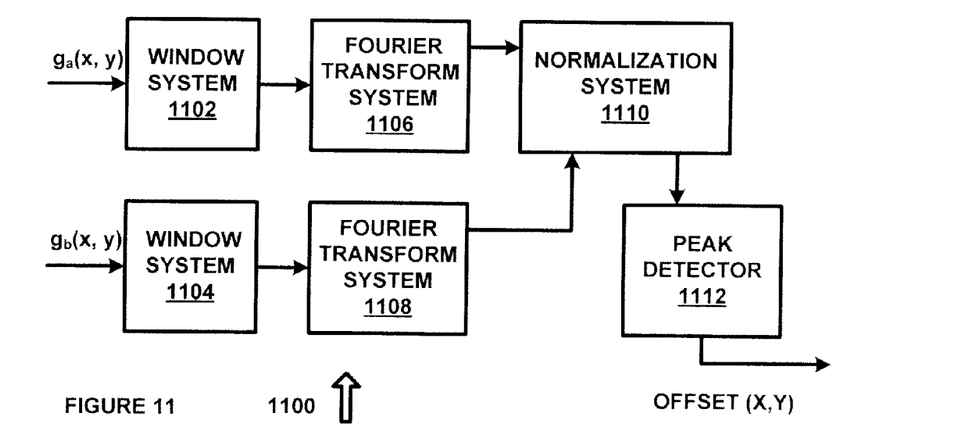
FIG. 11 is a diagram of a system and method for generating offset data in accordance with an exemplary embodiment of the present invention.

System 1000 receives a horizontal offset signal and a vertical offset signal, such as from system 1100 of FIG. 11 or other suitable horizontal offset signals and vertical offset signals. The derivative of the offset signals are then determined, and the fast RMS values of the derivatives are determined and $Z^{-n}$ transform is performed on the derivatives to generate a limit. A threshold is applied to the RMS values, and the outputs are multiplied by respective ratios. The ratio-multiplied outputs are further multiplied by the respective $Z^{-n}$ transform outputs, and the signal is subtracted from a summer for derivative removal.

In parallel, the horizontal offset and vertical offset are time corrected and processed by a $Z^{-n}$ transform, and are added to the corresponding summers. The horizontal and vertical derivative values are then squared and added, and the square root of the sum is subtracted as velocity correction from an anti-alias frequency setting. The output frequency is then applied to an anti-aliasing filter to generate a corrected horizontal offset and a corrected vertical offset, to improve image quality at low data rates for video data.

System 1000 provides phase correlation for video data that is resilient to noise and other defects typical of audiovisual content or advertising content. During repetitive images, phase correlation can generate results with several peaks in the resulting output. If the shift of the centroid exceeds a predetermined spatial threshold, such as by exceeding a predetermined velocity noise limit, the spatial jitter correction ratio should approach 1:1. Each displacement axis is input into independently into system 1000, where the result is directed into two paths. The first path compensates for the derivative phase and prediction delay, and the second path determines the derivative of the motion offset axis as confined within a predicative limit function and the first path, which compensates for the derivative phase and prediction delay. The path results are then subtracted, resulting in reduction of entropy of that axis. To compensate for the artifacts resulting from the removal of the motion derivative, the resultant is then integrated to reduce aliasing. The anti-aliasing filter spectrum is predetermined to affect best results for how aggressive the compression is anticipated. The aliasing filter is further modified to compensate for increases in vector velocity resulting from spatial (multi-axis) change. The spatial offset resultants are the applied to the next frame.

FIG. 11 is a diagram of a system 1100 and method for generating offset data in accordance with an exemplary embodiment of the present invention. System 1100 can be implemented in hardware or a suitable combination of software and hardware, such as one or more known software tools, such as in the NVIDIA CUDA software package or other suitable software packages for performing the associated function operating on a general purpose processing platform. System 1100 can also be implemented as a method performed by executing algorithms associated with the software tools or other well known algorithms associated with the disclosed functional blocks on a general purpose processing platform.

Motion estimation can be accomplished by processing serial input image data sets $g_a(x, y)$ and $g_b(x, y)$ with window systems 1102 and 1104, respectively, which apply a suitable two-dimensional window function (such as a Hamming window) to the sets of image data to reduce edge effects. Then, a discrete two dimensional Fourier transform of both sets of image data is generated using Fourier transform systems 1106 and 1108:

$$G_a = F(g_a); \text{ and}$$

$$G_b = F(g_b)$$

The cross-power spectrum is then calculated by normalization system 1110, such as by taking the complex conjugate of the Fourier transform of the second set of image data, multiplying the complex conjugate with the Fourier transforms of the first set of image data element-wise, and normalizing the product element-wise:

$$R = \frac{G_a G_b^*}{|G_a G_b^*|}$$

The normalized cross-correlation can be obtained by applying the inverse Fourier transform or in other suitable manners.

$$r = \mathcal{F}^{-1}\{R\}$$

The location of the peak in is generated using peak detector 1112, such as by using quarter pixel edge detection or other suitable processes.

$$(\Delta x, \Delta y) = \underset{(x,y)}{\operatorname{argmax}}\{r\}$$

A single peak value can be generated that represents the frame centroid shift expressed as a Cartesian (horizontal and vertical) offset, which can then be input to system 1000.

While certain exemplary embodiments have been described in detail and shown in the accompanying drawings, it is to be understood that such embodiments are merely illustrative of and not restrictive on the broad invention. It will thus be recognized to those skilled in the art that various modifications may be made to the illustrated and other embodiments of the invention described above, without departing from the broad inventive scope thereof. It will be understood, therefore, that the invention is not limited to the particular embodiments or arrangements disclosed, but is rather intended to cover any changes, adaptations or modifications which are within the scope and the spirit of the invention defined by the appended claims.

What is claimed is:

1. A system for processing video data to improve image quality at low data rates comprising:
an encoder operating on a processor and configured for generating an entropy signal representing a relative entropy of the video data; and
a plurality of filters each operating on the processor and configured for receiving the entropy signal and a threshold setting and filtering the video data if the entropy signal is greater than the threshold setting, wherein the filters comprise:
a variable anti-jitter filter;
a variable anti-alias filter; and
wherein the threshold settings of the variable jitter filter and the variable alias filter are symmetric.

2. The system of claim 1 further comprising a plurality of $Z^{-n}$ transform systems configured for processing the video data.

3. The system of claim 1 further comprising a plurality of RMS systems configured for processing the video data.

4. A system for processing video data to improve image quality at low data rates comprising:
an offset generation system operating on a processor and configured for receiving a plurality of frames of video data and generating offset data;
an offset derivative system operating on the processor and configured for receiving the offset data and generating offset derivative data;
a limit system operating on the processor and configured for receiving the offset derivative data and applying a predetermined threshold limit to the offset derivative data;
a time correction system operating on the processor and configured for receiving the offset data and generating time corrected offset data;
a derivative removal system operating on the processor and configured for receiving the time corrected offset data and the threshold limited offset derivative data and generating time-corrected, derivative-corrected offset data; and
an anti-aliasing system operating on the processor and configured for receiving the time-corrected, derivative-corrected offset data and generating corrected offset data.

5. The system of claim 4 wherein the offset generation system comprises a two dimensional Hamming window system configured for performing a two-dimensional Hamming window process on each of the plurality of frames of video data.

6. The system of claim 4 wherein the offset generation system comprises a peak detection system configured for performing peak detection processing on the plurality of frames of video data.

7. The system of claim 4 wherein the offset derivative system configured is for receiving vertical offset data and horizontal offset data and generating vertical offset derivative data and horizontal offset derivative data.

8. The system of claim 7 wherein the limit system comprises:
a vertical limit system configured for receiving the vertical offset derivative data and performing root mean square (RMS) processing on the vertical offset derivative data; and
a horizontal limit system configured for receiving the horizontal offset derivative data and performing RMS processing on the horizontal offset derivative data.

9. The system of claim 8 wherein the limit system comprises:
a vertical threshold system configured for receiving the RMS vertical offset derivative data and applying a predetermined vertical threshold limit to the RMS vertical offset derivative data; and
a horizontal threshold system configured for receiving the RMS horizontal offset derivative data and applying a predetermined horizontal threshold limit to the RMS horizontal offset derivative data.

10. The system of claim 9 wherein the time correction system comprises:
a vertical time correction system configured for receiving the vertical offset data and generating time corrected vertical offset data; and
a horizontal time correction system configured for receiving the horizontal offset data and generating time corrected horizontal offset data.

11. The system of claim 10 wherein the derivative removal system comprises:
a vertical derivative removal system configured for receiving the time corrected vertical offset data and the threshold-limited RMS vertical offset derivative data and generating time-corrected, derivative-corrected vertical offset data; and
a horizontal derivative removal system configured for receiving the time corrected horizontal offset data and the threshold-limited RMS horizontal offset derivative data and generating time-corrected, derivative-corrected horizontal offset data.

12. The system of claim 11 wherein the anti-aliasing system comprises:
a vertical anti-aliasing system configured for receiving the time-corrected, derivative-corrected vertical offset data and generating corrected vertical offset data; and
a horizontal anti-aliasing system configured for receiving the time-corrected, derivative-corrected horizontal offset data and generating corrected horizontal offset data.

13. The system of claim 4 further comprising a velocity correction system configured for receiving the threshold limited offset derivative data and generating a velocity correction factor.

14. The system of claim 12 further comprising:
a velocity correction system configured for receiving the threshold limited RMS vertical offset derivative data and the threshold limited RMS horizontal offset derivative data generating a velocity correction factor.

15. A method for processing video data to improve image quality at low data rates comprising:
receiving a plurality of frames of video data and generating offset data;
receiving the offset data and generating offset derivative data;
receiving the offset derivative data and applying a predetermined threshold limit to the offset derivative data;
receiving the offset data and generating time corrected offset data;
receiving the time corrected offset data and the threshold limited offset derivative data and generating time-corrected, derivative-corrected offset data; and
receiving the time-corrected, derivative-corrected offset data and generating corrected offset data.

16. The method of claim 15 wherein receiving the plurality of frames of video data and generating the offset data comprises performing a two-dimensional Hamming window processing on each of the plurality of frames of video data.

17. The method of claim 15 wherein receiving the plurality of frames of video data and generating the offset data comprises performing peak detection processing on the plurality of frames of video data.

18. The method of claim 15 wherein receiving the offset data and generating offset derivative data comprises receiving vertical offset data and horizontal offset data and generating vertical offset derivative data and horizontal offset derivative data.

19. The method of claim 18 comprising:
receiving the vertical offset derivative data and performing root mean square (RMS) processing on the vertical offset derivative data; and
receiving the horizontal offset derivative data and performing RMS processing on the horizontal offset derivative data.

\* \* \* \* \*